Figure 1:
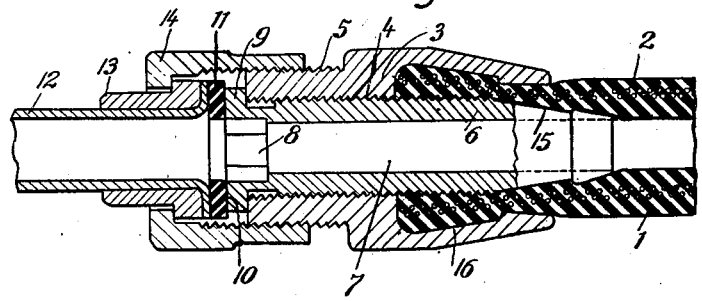

Oct. 22, 1940.  J. BERGER ET AL  2,219,218
PIPE AND HOSE UNION
Filed April 15, 1938  2 Sheets-Sheet 1

Inventors
Julius Berger
Rudolf Kaiser

Strauch & Hoffman
Attorneys

Oct. 22, 1940.  J. BERGER ET AL  2,219,218
PIPE AND HOSE UNION
Filed April 15, 1938  2 Sheets-Sheet 2

Inventors
Julius Berger
Rudolf Kaiser
Strauch & Hoffman Attorneys

Patented Oct. 22, 1940

2,219,218

UNITED STATES PATENT OFFICE 2,219,218

PIPE AND HOSE UNION

Julius Berger, Berlin-Wilhelmsruh, and Rudolf Kaiser, Berlin-Hohenneuendorf, Germany, assignors to Michigan Patents Corporation, Jackson, Mich.

Application April 15, 1938, Serial No. 202,346
In Germany September 3, 1936

3 Claims. (Cl. 285—86)

This invention relates to a pipe and hose union, more particularly for hose having a braided or other interlining or covering of fibrous material, and to a tool for facilitating the assembling of such unions.

The union is intended for use mainly for piping leading to vessels under liquid pressure, for air and other transport services, more particularly for brakes, or for the piping for the conveyance of liquid fuels, such as petrol, spirit and the like.

Of piping for such purposes a particularly high degree of reliability is necessarily required.

In carrying out durability tests with a number of hose unions of the usual kind it was found, that, although the union appeared at first to be tight, considerable trouble presented itself after some time. It was observed, that although the hose end which was embraced by a socket and was pressed by an inner, conical nipple against the wall of the socket is sufficiently sealed to the inside and outside, the pressure liquid will ooze through at some place or at several places remote from the union. The cause of this was found to be, that the liquid penetrates at the end of the hose into the bundles of fibres of the interlining and then travels considerable distances in the hose, until it flows out at some point which cannot be pretermined.

These disadvantages occur with all hose of the kinds under consideration, but more particularly with hose having a wire helix insertion.

A further disadvantage of hose unions as hitherto constructed resides in this, that the hose material at the place where it is clamped in is too weak to stand up to the continuous stresses due to vibrations acting from the outside or to the liquid pulsating in the hose and will break.

The invention has for its object to overcome the above disadvantages. For attaining this object the invention is characterised in this, that the inner nipple has two sealing surfaces and that the socket is provided with a conical bore disposed opposite the tapered end of the inner nipple and, forming a continuation of the said bore, with a recess for the reception of the hose end. The arrangement is made such that the hose end is subjected towards the interior of the socket to a gradually increasing pressure and is then released again by a place of greater diameter.

In all hose unions of the said kind it is sought to keep the internal diameter of the nipple equal to the internal diameter of the hose, but for various reasons this is hardly possible. For instance, such hose unions can only be assembled with great difficulty or the wall of the hose is excessively stressed at the clamping place, which leads to the hose breaking away.

The invention also relates to a tool which is intended for use with hose unions of the kind above described and enables the union to be put together in a very simple and secure manner.

A tool serving this purpose is characterised substantially in this, that a mandrel which fits into the inner nipple and extends beyond it is fixed to a tool having a manipulating handle, the tool having a friction surface which fits on a jointing surface of the nipple and being capable of being temporarily connected with the nipple.

Further features and advantages of the invention will be gathered from the following description, in which with reference to the accompanying drawings some constructional forms of the new hose union and a tool for putting it together are described.

Figure 2:
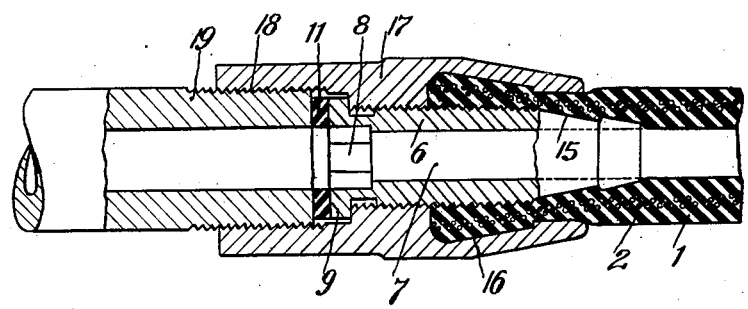
Figure 3:
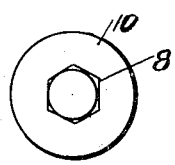
Figure 4:
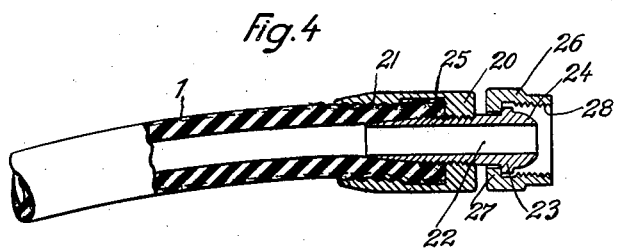
Figure 5:
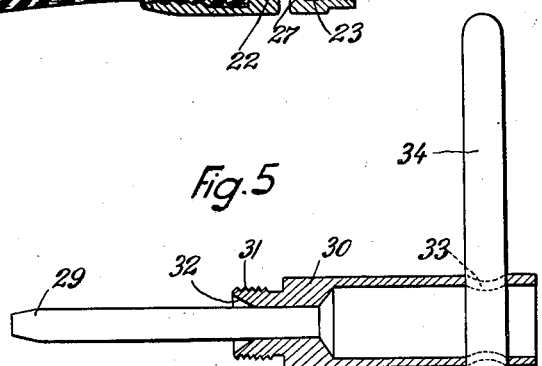
Figure 6:
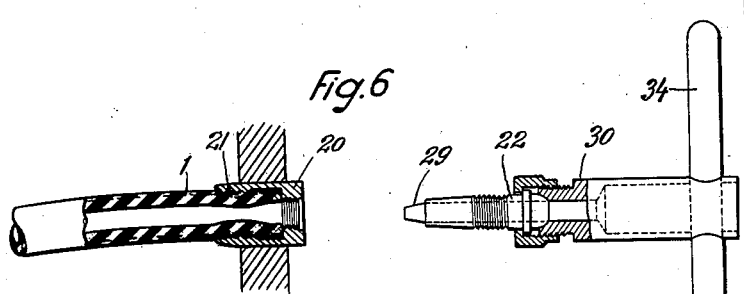
Figure 7:
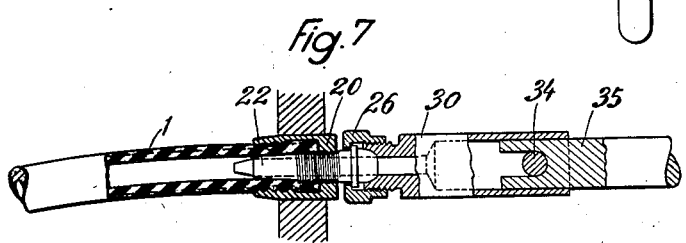

In the drawings:

Fig. 1 is a longitudinal section through a hose union according to the invention, Fig. 2 a longitudinal section through a modified form of a hose union according to the invention, Fig. 3 is an end view of the nipple, Fig. 4 a longitudinal section through a hose union of a different constructional form, Fig. 5 a section through the tool for introducing the nipple into the end of the hose, Fig. 6 a view showing how the tool is used for inserting the nipple and Fig. 7 a view, partly in section, of a hose union with the tool after the assembling of the hose union.

In Fig. 1 of the drawings 1 is a rubber hose with an insertion 2 of fibrous material, which may be braided, woven or wound in layers in known manner. The hose end is inserted into the socket 3 which is provided with the internal thread 4 and the external thread 5. Into the internal thread 4 is screwed the inner nipple 6 having the bore 7, the internal hexagon 8 and the end flange 9, the hose end being pressed from the inside against the wall of the socket 3 and thus firmly held in a reliable manner. The form of the outer surface 15 of the nipple 6 in conjunction with the form of the socket 3 shows some important features which are decisive for the properties of the whole hose union. As will be seen from the drawings, the surface 15 is conical. The oppositely disposed inner wall surface of the socket 3 must so formed that the hose end is subjected to a compression which gradually increases from the outer edge of the socket towards the inside. This compression on the one hand effects a tight sealing at the surface 15, on the other hand however the region of greatest compression is displaced somewhat inwards from the outer edge of the socket. This is of importance for the reason, that the hose would after a short time break away from the socket at the place of emergence, if it should experience the greatest compression just at this place, as is the case with many of the known constructions.

Furthermore, the interior of the socket 3 is widened out behind the region of the greatest compression of the hose, so that the hose end is entirely or almost entirely released from pressure in the widened region of the wall 16, whereby the otherwise difficult assembly of hose unions of similar constructions is greatly facilitated.

In contradistinction to earlier proposals the flange 9 has an entirely smooth surface 10, against which the packing ring 11 is pressed by means of the expanded pipe 12, the flanged sleeve 13 and the cap nut 14, the latter being screwed on to the thread 5 of the socket 3.

The packing ring 11 provides that the liquid will not, as heretofore, reach the end surface of the hose through the thread 4 and penetrate there into the cut off bundles of fibres of the insertion.

It has been found that the union will hold completely tight even in the case of mobile liquids, such as petrol and the like. It is of particular importance for the liquid to be kept from penetrating into the interior structure of the hose, when it in any case has a destructive effect on the material of the hose.

Fig. 2 shows a constructional form of the union, in which the socket 17 is provided with the internal thread 18, into which the pipe end 19 is screwed and with its end surface presses the packing ring against the flange of the inner nipple so as to form a tight joint.

Fig. 3 shows a view of the flange surface 10 of the inner nipple 6, Fig. 1, and reveals the internal hexagon 8 which is intended for the engagement of a hexagon key for screwing the inner nipple into the socket.

The two constructional examples illustrated have the advantage that they are releasable and it has been found that the union according to the invention is still usable even when subjected repeatedly to stresses up to the bursting pressure of the hose (about 400 atmospheres). It is significant, that the bursting of the hose takes place at any unforeseen point, but not at the union.

The hose 1, shown in Fig. 4, which for instance represents the end of a length of piping, is to be provided with a metallic head which will allow of it being connected to a pipe nipple or the like. For this purpose there is placed over the hose end the hose socket 20 in the form of a piece of tubing which is inwardly thickened at its forward end and the extension of which is provided with an internal thread 21. Into the hose socket 20 and the hose end 1 is screwed a nipple 22 which has at its forward end a flange 23 and a conical sealing surface 24. This nipple is provided with an external thread 25 which fits a corresponding internal thread in the thickened head end of the hose socket 20. The internal diameter of the nipple 22 is the same throughout its entire length and corresponds to the internal diameter of the hose 1. The external diameter of the nipple, however, becomes gradually smaller in the direction towards the hose, so that the walls of the nipple taper to a thin edge.

A cap nut 26 engages with an inwardly projecting flange 27 behind the flange 23 of the nipple 22. By means of the thread 28 of the cap nut the hose 1 may be connected with a pipe provided with an external thread, in such a manner that the sealing surface 24 of the nipple will be pressed against the correspondingly formed end surface of the piece of piping.

The putting together of such pipe and hose unions is very difficult, as the hose end which is to be pressed between the hose socket and the inner nipple offers a considerable resistance to the insertion of the inner nipple and the hose end will again and again move out of its socket.

The tool shown in Fig. 5 overcomes this difficulty. The tool consists of a mandrel 29 which is held in a socket 30. This socket is provided at its end with an external thread 31 which fits the thread 28 of the cap nut 26. The socket 30 also has at its end a jointing surface 32 which corresponds to the jointing cone 24 of the nipple 22. That end of the socket 30 which is remote from the mandrel must be provided with a handle for enabling the mandrel to be turned. For this purpose a tommy bar 34 is inserted with a tight fit into the holes 33 of the tubular end of the socket.

Fig. 6 shows how the tool is used when the union is to be put together. In the first place the hose socket 20 is placed over the hose end. This causes the internal diameter of the hose to be reduced in a manner corresponding to the peculiar form of the thread 21, the convolutions of which are highest in the middle of the whole extent of the thread and flatten off towards both ends.

This feature is important for the reason to be given hereinafter.

The cap nut is then screwed together with the nipple 22 on to the mandrel 29, until the jointing surface 32 on the tool and the jointing cone 24 on the nipple are pressed firmly against one another. Through the parts being thus pressed firmly against one another the nipple 22 will be carried round by friction, when the tool is turned. On the tool with the cap nut and the nipple thereupon being pushed into the hose end which has been prepared as in Fig. 6, the tapering mandrel will force the interior of the hose apart, so that the nipple can be inserted and the hose walls be further compressed. The peculiar form of the thread convolutions 21 already provides an increased security against the hose being forced out of the socket 20. The thread 25 on the nipple and the thread 28 of the cap nut are both right-handed. On the tool being turned to the right, the separate parts will therefore gradually assume the position shown in Fig. 7. This is further facilitated through the internal thread of the socket 20 being left-handed, so that, should the hose be turned with the nipple 22, the connection between the hose and the hose socket 20 will only become more intimate.

For enabling the nipple 22 to be introduced into the hose end and screwed on the mandrel 29 more easily, it is important for the nipple to be provided on the outside with a lubricant. The best lubricant for this purpose is graphite paste.

When the position shown in Fig. 7 has been reached, the tool is first released from the cap nut 26 by holding the cap nut and turning the tool to the left, so that the mandrel can then be simply withdrawn from the nipple.

In Fig. 7 a further advantageous way of using the tool 30 is shown. A piece of iron or a shaft 35 provided with a claw may be introduced into the tubular end of the tool, so that the hose may be connected up by turning the shaft 35.

The shape of the thread 21 in the socket 20 has the further advantage that the hose 1 retains its flexibility right up to the edge of the socket 20, without its walls being excessively stressed. This advantage is due both to the circumstance that the clamping pressure gradually ceases and that the end of the nipple 22 lies back from the end of the hose socket 20.

In hose unions as shown in Figs. 1 and 2 a similar tool to that used for the hose union according to Fig. 4 can be used for screwing in the inner nipple 6. In this case, however, the tool need not be provided with an external thread, it being only necessary to provide the tool with an external hexagon corresponding to the internal hexagon 8 and to provide at that surface of the external hexagon, which faces the handle of the tool, a flange which bears against the flange 9 of the inner nipple 6.

When screwing in the inner nipple 6 it is only necessary to press the tool lightly against the flange of the inner nipple. The mandrel which extends through the inner nipple beyond its free end acts in the same way as in the case of the tool shown in Figs. 5 to 7 for forcing aside the interior of the hose, so that the nipple can be introduced in the desired manner and can therefore further compress the hose walls. After the inner nipple 6 has been screwed in, the tool need only be withdrawn, whereupon the pipe 12 and the nipple 13 can be pressed against the inner nipple 6 by the cap nut 14, the packing ring 11 being interposed.

What we claim is:

1. A hose coupling consisting of a screw-connected socket and nipple engaging the end of a hose, the socket providing a wall surrounding a substantial portion of the end of the hose and the nipple projecting into the passage through the hose from said end, the portion of the nipple projecting into said passage tapering from a maximum thickness to a thin edge, the wall of said socket defining an annular chamber with a portion of said nipple and providing an inwardly projecting annular shoulder, said wall beyond said shoulder in a direction away from said end being of generally cylindrical shape and snugly engaging the hose over a substantial section of its length, the tapered portion of said nipple being opposite said shoulder of the socket and the thickest portion of the nipple being opposite the wall of the socket defining said annular chamber, said nipple and said shoulder cooperating to grip the hose with a maximum pressure in a zone at and adjacent said shoulder for distorting the material of the hose whereby the hose end is caused to fill said annular chamber.

2. A hose coupling consisting of a screw-connected socket and nipple engaging the end of a hose; the socket providing a wall surrounding a substantial portion of the end of the hose and the nipple projecting into the passage through the hose from said end, the portion of the nipple projecting into said passage tapering from a maximum thickness to a thin edge, the wall of said socket defining an annular chamber with a portion of said nipple, said wall having an inwardly projecting spiral rib terminating abruptly and providing an annular shoulder, said wall beyond said shoulder in a direction away from said end being of generally cylindrical shape except for said rib and snugly engaging the hose over a substantial section of its length, the tapered portion of said nipple being opposite said shoulder of the socket and at least a portion of said rib and the thickest portion of the nipple being opposite the wall of the socket defining said annular chamber, said nipple and said shoulder cooperating to grip the hose with a maximum pressure in a zone at and adjacent said shoulder for distorting the material of the hose whereby the hose end is caused to fill said annular chamber.

3. A hose coupling consisting of a screw-connected socket and nipple engaging the end of a hose, the socket providing a wall surrounding a substantial portion of the end of the hose and the nipple projecting into the passage through the hose from said end, the portion of the nipple projecting into said passage tapering from a maximum thickness to a thin edge, the wall of said socket defining an annular chamber with a portion of said nipple, said wall having an inwardly projecting spiral rib terminating abruptly and providing an annular shoulder, said wall beyond said shoulder in a direction away from said end being of generally cylindrical shape and snugly engaging the hose over a substantial section of its length, said rib being continued along said wall beyond said shoulder and having a maximum height at a point intermediate the ends of the rib and a gradually diminishing height from said point toward said ends of the rib, the tapered portion of said nipple being opposite said shoulder of the socket and the highest point of said rib and the thickest portion of the nipple being opposite the wall of the socket defining said annular chamber, said nipple and said shoulder cooperating to grip the hose with a maximum pressure in a zone at and adjacent said shoulder and the highest point of said rib for distorting the material of the hose whereby the hose end is caused to fill said annular chamber.

JULIUS BERGER.
RUDOLF KAISER.